(12) United States Patent
Jia et al.

(10) Patent No.: US 11,216,919 B2
(45) Date of Patent: Jan. 4, 2022

(54) IMAGE PROCESSING METHOD, APPARATUS, AND COMPUTER-READABLE RECORDING MEDIUM

(71) Applicants: Haijing Jia, Beijing (CN); Hong Yi, Beijing (CN); Liyan Liu, Beijing (CN); Wei Wang, Beijing (CN)

(72) Inventors: Haijing Jia, Beijing (CN); Hong Yi, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 25 days.

(21) Appl. No.: 16/807,589

(22) Filed: Mar. 3, 2020

(65) Prior Publication Data

US 2020/0286212 A1 Sep. 10, 2020

(30) Foreign Application Priority Data

Mar. 7, 2019 (CN) .......................... 201910170972.8

(51) Int. Cl.
*G06T 5/00* (2006.01)
*G06T 3/40* (2006.01)
*G06T 5/50* (2006.01)

(52) U.S. Cl.
CPC ............ *G06T 5/006* (2013.01); *G06T 3/4038* (2013.01); *G06T 5/50* (2013.01); *G06T 2207/20021* (2013.01)

(58) Field of Classification Search
CPC ............ H04N 5/23238; H04N 5/2628; G06K 2009/363; G06K 9/00362; G06K 9/00624;
(Continued)

(56) References Cited

U.S. PATENT DOCUMENTS 9,483,835 B2 11/2016 Liang et al.
9,552,514 B2 1/2017 Zhao et al.
(Continued)

FOREIGN PATENT DOCUMENTS

GB 2560387 9/2018
JP 2005-010521 1/2005
(Continued)

OTHER PUBLICATIONS

Tehrani Mahdi Abbaspour et al: "Correcting perceived perspective distortions using object specific planar transformations", 2016 IEEE International Conference on Computational Photography (ICCP), IEEE, May 13, 2016 (May 13, 2016), pp. 1-10, XP032912429, DOI: 10.1109/ICCPHOT.2016.7492868 [retrieved on Jun. 15, 2016].
(Continued)

*Primary Examiner* — Kim Y Vu
*Assistant Examiner* — Francisco A Agra
(74) *Attorney, Agent, or Firm* — IPUSA, PLLC

(57) ABSTRACT

An image processing method includes obtaining an original image; partitioning the original image into a first part and a second part such that distortion of at least a part of an image in the first part of the original image is smaller than a predetermined threshold, and distortion of at least a part of an image in the second part of the original image is greater than or equal to the predetermined threshold; correcting the second part of the original image so as to obtain a distortion-corrected image corresponding to the second part; and recognizing the first part of the original image and the distortion-corrected image so as to recognize an object in the original image.

9 Claims, 8 Drawing Sheets

(58) Field of Classification Search
CPC ... G06K 9/3233; G06T 3/0012; G06T 3/0043; G06T 3/0062; G06T 3/4038; G06T 5/001; G06T 5/006; G06T 5/50; G06T 2207/20021; G06T 2207/20084
See application file for complete search history.

(56) References Cited

U.S. PATENT DOCUMENTS

| | | | |
|---|---|---|---|
| 10,074,010 | B2 | 9/2018 | Chen et al. |
| 10,977,515 | B2* | 4/2021 | Watanabe ............... G06K 9/46 |
| 2004/0257677 | A1 | 12/2004 | Matsusaka |
| 2005/0213847 | A1* | 9/2005 | Takane ................... H04N 5/217 382/275 |
| 2011/0216158 | A1* | 9/2011 | Bigioi ................ H04N 5/23238 348/36 |
| 2012/0056800 | A1 | 3/2012 | Williams et al. |
| 2015/0104067 | A1 | 4/2015 | Liu |
| 2017/0178372 | A1* | 6/2017 | Gormish .............. G06K 9/4671 |
| 2019/0066276 | A1 | 2/2019 | Kawana |
| 2020/0273205 | A1* | 8/2020 | Yamashita .............. G06T 15/20 |

FOREIGN PATENT DOCUMENTS

| | | |
|---|---|---|
| JP | 2018-034588 | 3/2018 |
| WO | 2011/107448 | 9/2011 |

OTHER PUBLICATIONS

Extended European Search Report for EP 20160896.5 dated Jul. 31, 2020.

Haike Guan, Makoto Shinnishi, "Recognizing and position measuring of workers at workplaces using a fish-eye camera", SSII2018 The 24th Symposium on Sensing via Image Information [USB], Japan, Dec. 31, 2018 With English Abstract.

Zhe Cao et al, Realtime Multi-person 2D Pose Estimation Using Part Affinity Fields, 2017 IEEE Conference on Computer Vision and Pattern Recognition (CVPR), United States, IEEE, Jul. 26, 2017, 1302-1310, URL, https://ieeexplore.ieee.org/document/8099626.

* cited by examiner

IMAGE PROCESSING METHOD, APPARATUS, AND COMPUTER-READABLE RECORDING MEDIUM

BACKGROUND OF THE INVENTION

1. Field of the Invention

The present disclosure relates to the field of image processing, in particular, relates to image processing methods, apparatuses, and computer-readable recording media.

2. Description of the Related Art

In an image forming process such as the equidistant cylindrical projection (formation of a planar image transformed from a 360-degree panoramic image), due to factors such as the image sampling method, perspective error during image formation, or image conversion method, there is a likelihood of forming a distortion image having deformation such as twisting, stretching, and pressing. Such distortions can be removed by correcting the distortion image, and the corrected image can be further used for performing an object recognition process with respect to a person or an object.

In an ordinary process of distortion image correction and object recognition, it is generally necessary to correct the entire distortion image. Thereafter, detection frames are set based on objects to be recognized in the corrected image, and the detection frames are mapped and rearranged on the distortion image. Finally, by processing the overlapping detection frames, a final result of object recognition is obtained. However, in such a method of image correction and object recognition, it is necessary to perform merging of detection frames of objects to be recognized multiple times. This complicates the processing steps and causes a problem that the object recognition precision is not high. In addition, if directly performing the object recognition without correcting the distortion image, the precision of the object recognition may become too low.

For this reason, there has been demand for an image processing method and an image processing method apparatus that can further improve the precision of object recognition and simplify the image processing steps.

SUMMARY OF THE INVENTION

In order to solve the above technical problem, according to one aspect in the present disclosure, an image processing method is provided that includes steps of obtaining an original image; partitioning the original image into a first part and a second part such that distortion of at least a part of an image in the first part of the original image is smaller than a predetermined threshold, and distortion of at least a part of an image in the second part of the original image is greater than or equal to the predetermined threshold; correcting the second part of the original image so as to obtain a distortion-corrected image corresponding to the second part; and recognizing the first part of the original image and the distortion-corrected image so as to recognize an object in the original image.

According to another aspect in the present disclosure, an image processing apparatus is provided that includes an obtainment unit configured to obtain an original image; a partition unit configured to partition the original image into a first part and a second part such that distortion of at least a part of an image in the first part of the original image is smaller than a predetermined threshold, and distortion of at least a part of an image in the second part of the original image is greater than or equal to the predetermined threshold; a correction unit configured to correct the second part of the original image so as to obtain a distortion-corrected image corresponding to the second part; and a recognition unit configured to recognize the first part of the original image and the distortion-corrected image so as to recognize an object in the original image.

According to yet another aspect in the present disclosure, an image processing apparatus is provided that includes a processor; and a memory configured to store computer program commands, wherein when the computer program commands are executed by the processor, the image processing apparatus causes the processor to execute obtaining an original image; partitioning the original image into a first part and a second part such that distortion of at least a part of an image in the first part of the original image is smaller than a predetermined threshold, and distortion of at least a part of an image in the second part of the original image is greater than or equal to the predetermined threshold; correcting the second part of the original image so as to obtain a distortion-corrected image corresponding to the second part; and recognizing the first part of the original image and the distortion-corrected image so as to recognize an object in the original image.

According to yet another aspect in the present disclosure, a non-transitory computer-readable recording medium is provided. The medium has computer program commands stored thereon, which when executed, cause a computer that includes a memory and a processor, to execute a method including: obtaining an original image; partitioning the original image into a first part and a second part such that distortion of at least a part of an image in the first part of the original image is smaller than a predetermined threshold, and distortion of at least a part of an image in the second part of the original image is greater than or equal to the predetermined threshold; correcting the second part of the original image so as to obtain a distortion-corrected image corresponding to the second part; and recognizing the first part of the original image and the distortion-corrected image so as to recognize an object in the original image.

According to the image processing method, apparatus, or computer-readable recording medium in the present disclosure, it is possible to partition an obtained original image, and to correct only the second part in the original image to be supplied to the subsequent object recognition process. Such an image processing method, apparatus, or computer-readable recording medium enables to reduce the number of processing steps of image correction, to improve the efficiency of image processing, and to improve the precision of object recognition.

Also, according to an image processing method, apparatus, or computer-readable recording medium of an embodiment in the present disclosure, unlike using a merging process for detecting frames when recognizing objects in an image, training data is used for a neural network, by which an object is recognized at a finer vector level. This enables to further improve the precision of object recognition.

BRIEF DESCRIPTION OF DRAWINGS

By describing the embodiments of the present application in more detail in conjunction with the drawings, the above contents, objectives, features, and advantages of the present application will become more apparent.

DETAILED DESCRIPTION OF THE EMBODIMENTS

In the following, an image processing method, an apparatus, and a computer-readable recording medium will be described according to embodiments in the present disclosure. Throughout the drawings, the same numbers are assigned to the same elements. It is self-evident that the embodiments described herein are used only for explanation and do not limit the scope of the present inventive concept.

Figure 1:
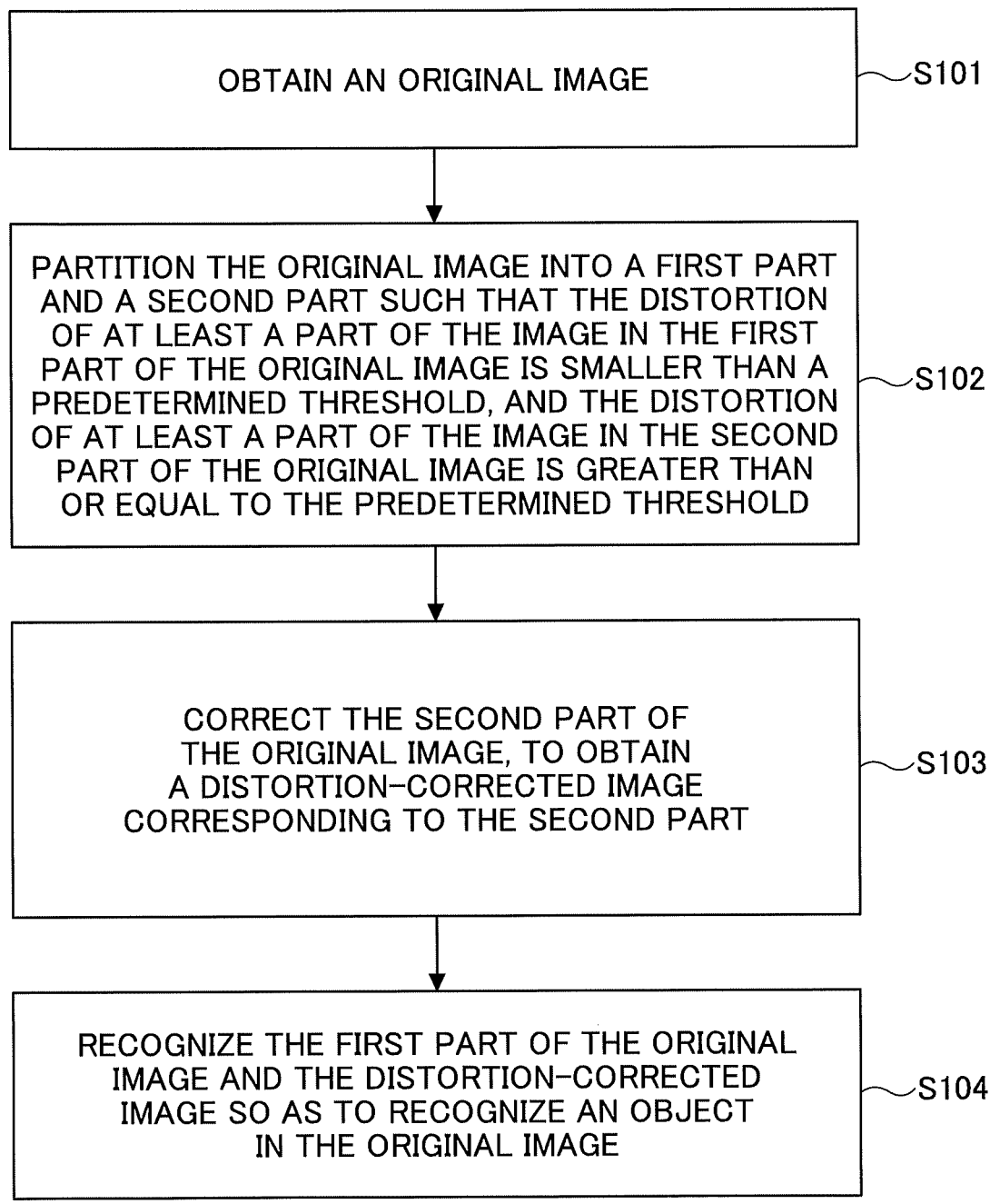
FIG. 1 is a flow chart of an image processing method according to an embodiment of the present application.

In the following, with reference to FIG. 1, an image processing method will be described according to an embodiment in the present disclosure. The image processing method according to the embodiment in the present disclosure can be applied to a static image, but is not limited to such; it can also be applied to video frames in video that change with time. FIG. 1 illustrates a flow chart of the image processing method 100.

As illustrated in FIG. 1, an original image is obtained at Step S101.

At this step, the obtained original image may be a two-dimensional image obtained by an image collection device such as a camera or a video camera, or a two-dimensional frame image cut out from a video. Preferably, in the case where the image collection device is a panoramic camera and the obtained image is a 360-degree panoramic image, the original image may be a two-dimensional image in which the panoramic image is mapped by coordinate transformation. For example, the original image here may be an equidistant cylindrical view in which the panoramic image is mapped by transformation of a latitude-longitude coordinate system.

At Step S102, the original image is partitioned into a first part and a second part such that the distortion of at least a part of an image in the first part of the original image is smaller than a predetermined threshold, whereas the distortion of at least a part of an image in the second part of the original image is greater than or equal to the predetermined threshold.

At this step, based on the predetermined threshold, it is possible to partition the original image into the first part and the second part. The predetermined threshold may be set based on the scene in which the original image was captured, the type of an object to be recognized, or the like. As one example, it is possible that the first part and the second part of the original image do not overlap each other. As another example, it is possible that the first part and the second part in the original image partially overlap each other. Alternatively, the overlapping parts may be very small, for example, may be constituted with only some lines or some points. Further, in an embodiment, it is possible that the original image includes only a first part and a second part that do not overlap or have tiny overlapping parts. In other examples, the original image may further include a third part or the like that does not overlap with the first part and the second part, or that has tiny overlapping parts. For example, an object to be recognized may not be included in the third part. This eliminates the need to perform subsequent object recognition processing for the third part, which further reduces the number of calculation steps in image processing, and thereby, improves the efficiency of the image processing.

Figure 2A:
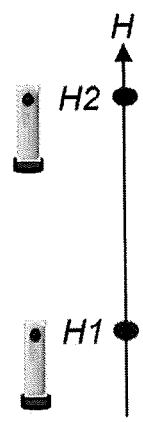
FIG. 2A is a diagram illustrating an example of height from the ground of a panoramic camera according to an embodiment of the present application.
Figure 2B:
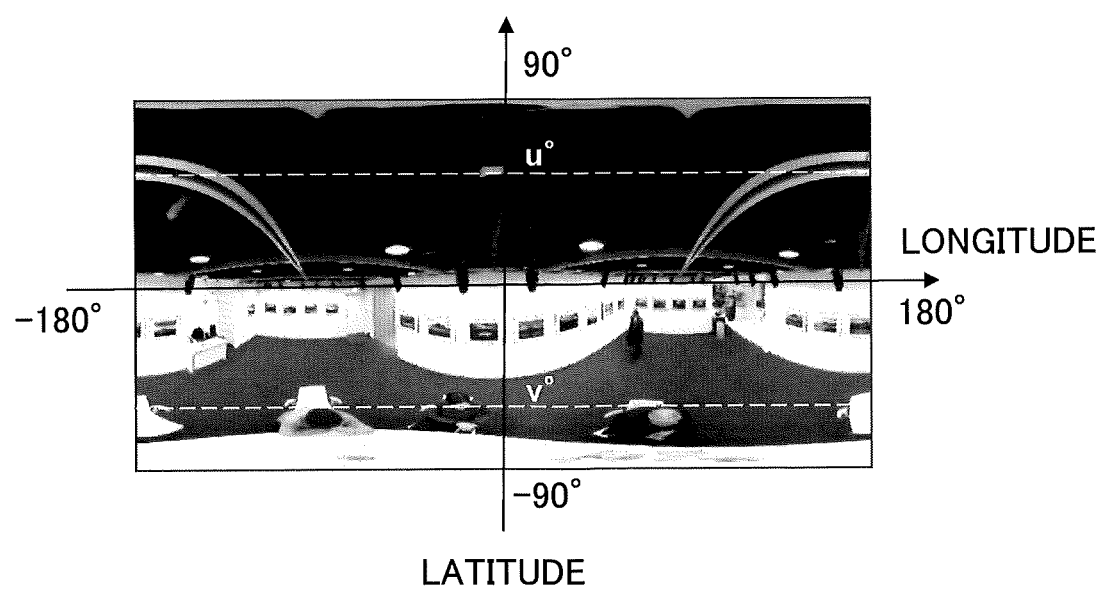
FIG. 2B is a diagram illustrating an example in which an original image is partitioned according to the position of a panoramic camera in an embodiment of the present application.

For example, in the case where the original image is an equidistant cylindrical view, based on the position of a panoramic camera used when the image was obtained, it is possible to partition the original image into a first part and a second part. FIG. 2A is a diagram illustrating an example of height from the ground of a panoramic camera according to an embodiment of the present application. In FIG. 2A, the height H of the panoramic camera from the ground can be H1 or H2 where the height H1 is lower than the height H2. FIG. 2B is a diagram illustrating an example in which an original image is partitioned according to the position of a panoramic camera. In an equidistant cylinder view obtained by the panoramic camera illustrated in FIG. 2B, the vertical coordinate indicates a latitude ranging from −90° to 90°, and the horizontal coordinate indicates a longitude ranging from −180° to 180°. In FIG. 2B, in the case where the height of the panoramic camera from the ground is lower than or equal to the height H1 illustrated in FIG. 2A, it is possible to partition the equidistant cylindrical view into a part at a latitude u° and above (e.g., up to 90°) as the second part of the original image, and the remaining part of the original image as the first part. In the case where the height of the panoramic camera from the ground is higher than or equal to the height H2 illustrated in FIG. 2A, it is possible to partition the equidistant cylindrical view into a part at a latitude v° and below (e.g., down to −90°) as the second part of the original image, and the remaining part of the original image as the first part. Here, the heights H1 and H2 may be input in advance based on the arranged position of the panoramic camera, and u and v can be calculated based on the input heights. In another example, the height of the panoramic camera is not necessarily input in advance; like estimating the height of the panoramic camera, it is possible to recognize the position of a particular object, for example, such as a lamp or a table, in the panoramic image. By this method, it is possible to partition the original image into a first part and a second part such that the distortion of at least a part of an image in the first part of the original image is smaller than a predetermined threshold, whereas the distortion of at least a part of an image in the second part of the original image is greater than or equal to the predetermined threshold. In this example, when the panoramic camera is set at different heights, the difference in the distributed position (e.g., the height in the equidistant cylindrical view) of an object to be recognized (e.g., a person standing on the ground) in an equidistant cylindrical view is considered. Therefore, by using different partitioning schemes for panoramic images, it is possible to save the resources for image processing as much as possible, and to improve the processing efficiency. The embodiment in which an original image is partitioned according to the height of the panoramic camera is merely an example, and is not limited as such. In practical applications, the original image may be partitioned by other criteria (e.g., the distribution method of a panorama camera, the type of an object to be recognized, the position of an area of interest, and the like).

At Step S103, the second part of the original image is corrected, to obtain a distortion-corrected image corresponding to the second part.

Figure 3:
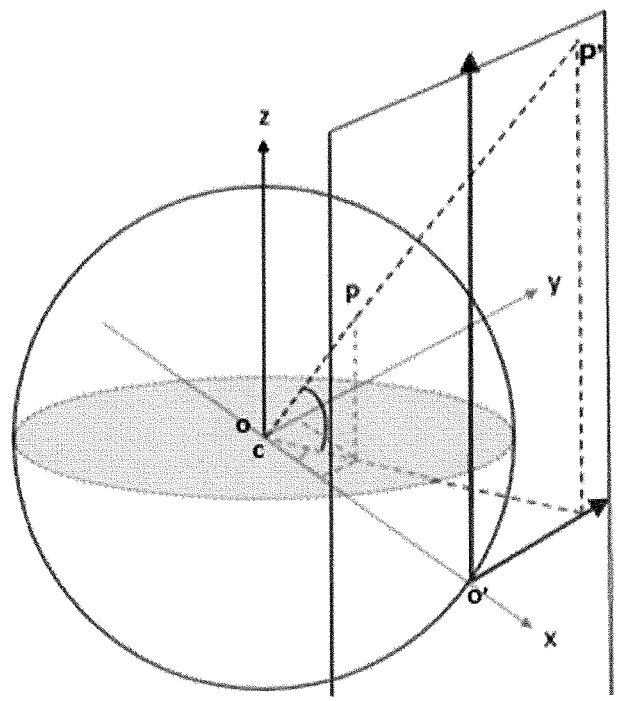
FIG. 3 is a diagram illustrating an example of performing a perspective projection transformation for a panoramic image in an embodiment of the present application.

At this step, it is possible to apply a projection transformation to the second part of the original image, to obtain the distortion-corrected image. Alternatively, a perspective projection transformation may be applied to the second part of the original image, to obtain a corresponding panoramic perspective view. In the example illustrated in FIG. 3, first, the second part of the original image is transformed from a latitude-longitude coordinate system to a spherical coordinate system where the center of the sphere is C and the radius is R, and a point P on the spherical coordinate system can be projected onto a plane that is tangent to any longitude line. Specifically, a point P', which is obtained by extending a straight line connecting a predetermined point O (in FIG. 3, the point O is equivalent to the center C of the sphere) and the point P on the spherical surface to a plane that is tangent to the sphere at O', can be set as a corresponding perspective point. Here, as illustrated in FIG. 3, the point O' can be positioned on the spherical surface.

Figure 4:
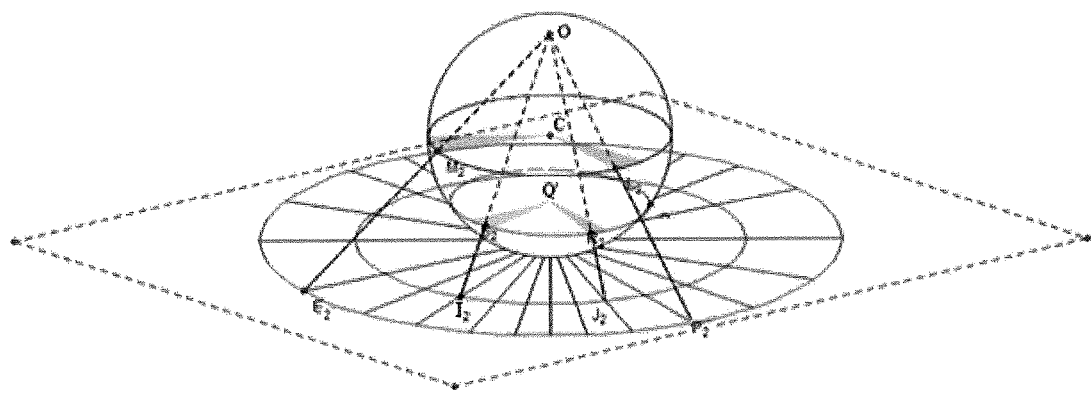
FIG. 4 is a diagram illustrating an example of performing a stereographic projection transformation for a panoramic image in an embodiment of the present application.

Also, it may be possible to apply the stereo projection transformation to the second part of the original image, to obtain a corresponding stereo projection view as the distortion-corrected image. FIG. 4 is a diagram illustrating an example of performing the stereographic projection transformation of a panoramic image in an embodiment of the present application. In the example illustrated in FIG. 4, first, the second part of the original image is mapped from a latitude-longitude coordinate system to a spherical coordinate system where the center of the sphere is C and the radius is the same R, and a point P on the spherical coordinate system can be projected onto a plane that is tangent to the sphere at any point Q'. In the stereo projection transformation, as illustrated in FIG. 4, the point Q' can be a poll in the spherical coordinate system. Specifically, a point at which a straight line connecting the predetermined point O and a certain point on the spherical surface intersects a plane that is tangent to the sphere at Q' (i.e., a plane that is tangent to the sphere one pole of the spherical coordinate system) can be set as a corresponding projection point. In FIG. 4, for example, the projection point of a point $M_2$ in the spherical coordinate system is $E_2$; the projection point of a point $S_2$ in the spherical coordinate system is $I_2$; the projection point of a point $R_2$ in the spherical coordinate system is $J_2$; and the projection point of the point $L_2$ in the spherical coordinate system is $P_2$.

The above method of applying a projection transformation to the second part of the original image so as to obtain a distortion-corrected image is merely an example, and is not limited as such. In practical applications, any method can be adopted for applying a projection transformation to the second part of an original image.

At Step S104, the first part of the original image and the distortion-corrected image is recognized so as to recognize an object in the original image.

At this step, optionally, objects in the original image may be recognized in the first part of the original image and in the distortion-corrected image, respectively. Alternatively, the first part of the original image and the distortion-corrected image may be stitched together to obtain a stitched image, so as to recognize in the obtained stitched image an object in the original image. This recognition method enables to further reduce the steps required for object recognition.

Specifically, the method of recognizing the first part of the original image and the distortion-corrected image may include the following operations: recognizing feature points and/or recognizing feature point coupling relationships with respect to the first part of the original image and the distortion-corrected image; obtaining the feature points and/or the feature point coupling relationships of the first part of the original image, based on a recognition result of the first part of the original image; and obtaining the feature points and/or the feature point coupling relationships of the distortion-corrected image, based on the recognition result of the distortion-corrected image. Based on the above contents, after the feature point reliability and/or the feature point coupling vector field of the distortion-corrected image have been obtained, the obtained feature point reliability and/or the feature point coupling vector field of the distortion-corrected image can be further mapped back into the second part of the original image, to obtain the feature point reliability and/or the feature point coupling vector field of the second part of the corresponding original image.

Thereupon, recognition of the feature points and/or recognition of the feature point coupling relationships with respect to the first part of the original image and the distortion-corrected image, can further include obtaining the feature point reliability and/or the feature point coupling vector fields of the first part of the original image and the distortion-corrected image, based on training data, by using a neural network, where the training data is data of the feature points and/or the feature point coupling relationships of an object.

Finally, after having obtained the feature point reliability and/or the feature point coupling vector fields of the first part and the second part of the original image, respectively, it is possible to recognize the object in the original image. For example, a detection frame of an object in the original image may be generated (e.g., a face recognition frame, a human body recognition frame, an object recognition frame, and the like).

According to an embodiment in the present disclosure, an object to be recognized in an original image may be a person or an object in the image. For example, in the case where an object to be recognized is a person, a robot, or an animal that includes various joint points and corresponding coupling relationships of the joint points, optionally, a feature point may be a joint point, and a feature point coupling relationship may be a joint point coupling relationship in an embodiment in the present disclosure. In the following, taking these as examples, a specific method of recognizing a person in an original image as an object will be described in the case where the original image is an equidistant cylindrical view.

Figure 5:
FIG. 5 is a diagram illustrating an example of an image to be processed, which is obtained by stitching a first part of an original image and a distortion-corrected image according to an embodiment in the present disclosure.

In the specific recognition process, data of human joint points and joint point coupling relationships can be used as training data, and by using a neural network, the method obtains the joint point reliability and the joint point coupling vector fields of the first part of an original image and the distortion-corrected image. FIG. 5 is a diagram illustrating an example of an image to be processed, which is obtained by stitching a first part of an original image and a distortion-corrected image according to an embodiment in the present disclosure. In FIG. 5, the left part of the stitched image is the first part of the original image that does not require correction, and the right part of the stitched image is the distortion-corrected image after the projection transformation has been applied to the second part of the original image. Optionally, the joint points of a person to be recognized may be set in advance, which may include the following joints: neck, left shoulder, right shoulder, left elbow, right elbow, left wrist, right wrist, left groin, and right groin, as nine types of joints in total. The joint point coupling relationships to be recognized for a person include: neck and left shoulder, neck and right shoulder, left shoulder and left elbow, right shoulder and right elbow, left elbow and left wrist, right elbow and right wrist, neck and left groin, neck and right groin, as eight types of joint point coupling relationships; in other words, eight types of joint point coupling vectors are to be generated. Therefore, in the case of using a neural network to recognize the joint points and the joint point coupling relationships, as the training data, it is possible to use data of the above-described nine types of joints and eight types of joint point coupling relationships of persons previously collected and obtained. In other words, in training data to be adopted and recognition results to be obtained, the number of types of joint points is denoted as Num_joint=9, and the number of types of the joint point coupling relationships is denoted as Num_connections=8.

After having trained the neural network with the training data, the trained neural network recognizes the feature points and/or the feature point coupling relationships of the first part of the original image and the distortion-corrected image. As a result, it is possible to obtain the joint point coupling vector fields constituted with the joint point reliability and the joint point coupling vectors of the first part of the original image and the distortion-corrected image. For example, the obtained joint point reliability can be represented as a matrix jcm[H, W, Num_joints], and the joint point coupling vector field constituted with the joint point coupling vectors can be represented as a matrix jaf[H, W, 2Num_connections]. Here, there exists a two-dimensional representation for each joint point coupling vector in a joint point coupling vector field, which is taken into consideration. Therefore, in the corresponding representation matrix, the joint point coupling vector field can be represented by matrix dimensions that are twice greater than the number of types of joint point coupling relationships. For example, in the case where there are eight types of joint point coupling relationships, for each type of the joint point coupling vector, a two-dimensional representation matrix of the joint point coupling vector is stored (for example, by using one one-dimensional representation matrix in it, the vector coordinate in the x direction is stored, and by using the other one-dimensional representation matrix, the vector coordinate in the y direction is stored). This enables to store eight types of joint point coupling vectors as a 16-dimensional representation matrix. Needless to say, the storage method of the joint point reliability and the joint point coupling vectors is merely an example, and is not limited as such. In one example, the length of a joint point coupling vector may represent the reliability of the corresponding joint point coupling relationship. In this case, for example, in the case where the joint point coupling vector is long, it may indicate that the reliability of the corresponding joint point coupling relationship is high. Conversely, in the case where the joint point coupling vector is short, it may indicate that the reliability of the corresponding joint point coupling relationship is low. Also, in the above matrix, H and W may represent the height and the width, respectively, of an image to which object recognition needs to be applied. For example, in the case of processing the stitched image of the first part of the original image and the distortion-corrected image illustrated in FIG. 5, H and W may be the height and the width of the stitched image, respectively. In the case of processing each of the first part of the original image and the distortion-corrected image, each of the first part of the original image and the distortion-corrected image may have corresponding representation matrices of the joint point reliability and the joint point coupling vector, and these matrices may include different values of H and W.

Figure 6:
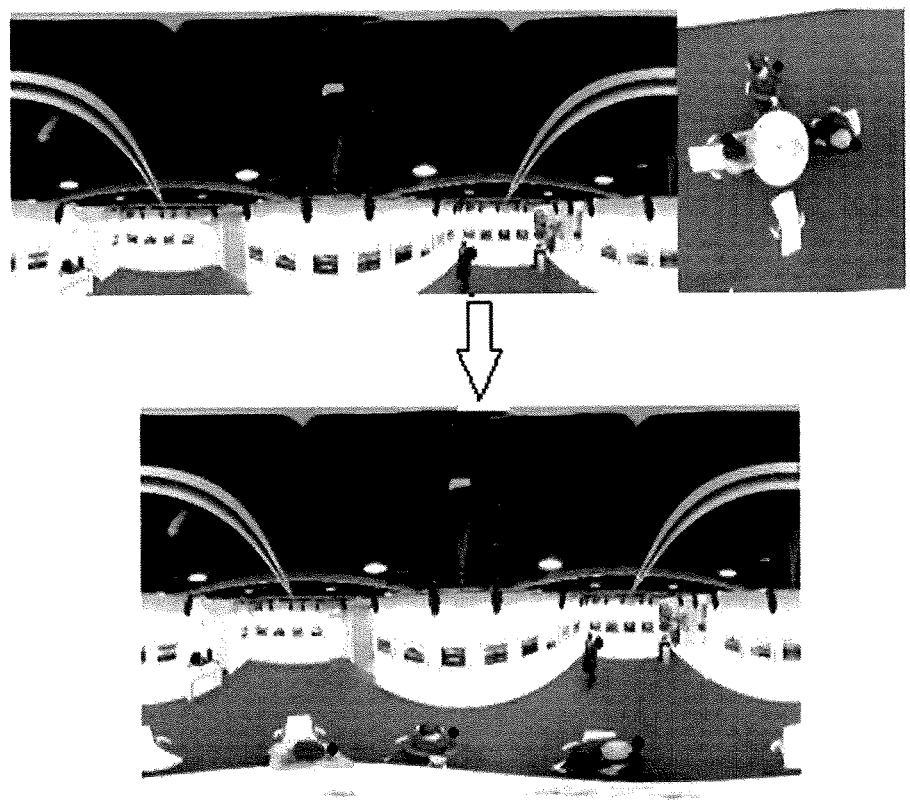
FIG. 6 is a diagram illustrating an example in which a certain joint point in an image, which is obtained by stitching a first joint of an original image and a distortion-corrected image, is mapped into the original image, in an embodiment in the present disclosure.

After having obtained the joint point reliability and the joint point coupling vector field of the distortion-corrected image, further, the obtained joint point reliability and the joint point coupling vector field of the distortion-corrected image are mapped back into the second part of the original image. This enables to obtain the joint point reliability and the joint point coupling vector field of the second part of the corresponding original image. Specifically, based on a mapping relationship between the distortion-corrected image and the second part of the original image, it is possible to map the joint point reliability of the distortion-corrected image back into the second part of the original image. FIG. 6 is a diagram illustrating that, after having stitched the first part of the original image and the distortion-corrected image, one type of joint point (left shoulder) in the stitched image is mapped back into the original image according to an embodiment in the present disclosure. The arrow in the middle indicates a mapping process. Here, in this case, no projection transformation has been performed on the first part of the original image. Therefore, there is no change in the reliability of the joint point obtained in the first part of the original image. Then, based on a mapping relationship between the distortion-corrected image and the second part of the original image, for the distortion-corrected image, the joint reliability of the left shoulder of the distortion-corrected image can be mapped back into the second part of the original image. All of the obtained left shoulder joint points in the original image are indicated by black dots.

Figure 7:
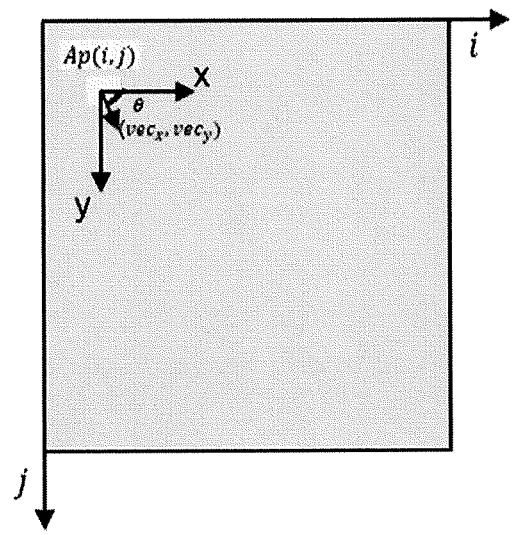
FIG. 7 is a diagram illustrating one joint point coupling vector shown in a joint point coupling vector field obtained from a distortion-corrected image.

FIG. 7 is a diagram illustrating one joint point coupling vector shown in a joint point coupling vector field obtained from a distortion-corrected image. A vector vec illustrated in FIG. 7 starts from a pixel position Ap(i, j) in a distortion-corrected image, and extends in a direction toward (vec$_x$, vec$_y$) illustrated in FIG. 7 where i and j are the absolute coordinates of the pixels along the i direction and j direction, respectively, in an ij coordinate system). According to the embodiment in the present disclosure, the joint point coupling vector vec of the distortion-corrected image in FIG. 7 needs to be mapped back into the second part of the original image. In the mapping process, by setting Ap(i, j) as the origin and the x-axis and y-axis in FIG. 7 as coordinate axes, first, the included angle θ between the vector vec and the x-axis and the length l can be calculated. Specifically, the calculation can be expressed as follows.

$$\theta = \arctan \frac{vec_y}{vec_x} \quad (1)$$

$$l = \sqrt{vec_x^2 + vec_y^2} \quad (2)$$

Here, $vec_x$ represents a projection distance in the x direction of the joint point coupling vector vec with the setting of Ap(i, j) as the origin, namely, represents a pixel coordinate value in the x direction. Also, $vec_y$ represents a projection distance in the y direction of the joint point coupling vector vec with the setting of Ap(i, j) as the origin, namely, represents a pixel coordinate value in the y direction.

Figure 8:
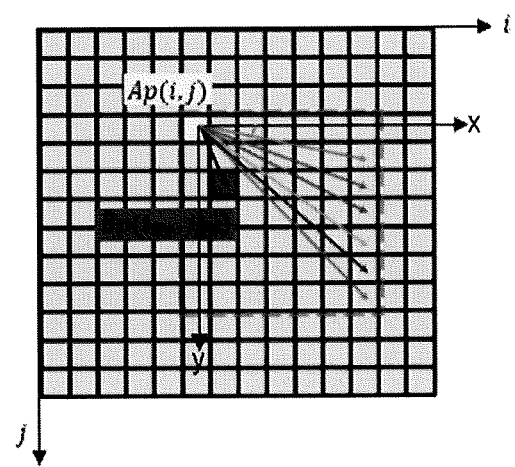
FIG. 8 is a diagram illustrating an example of a search grid constructed for the vectors illustrated in FIG. 7.

Thereafter, a search grid can be constructed with the setting of Ap(i, j) as the origin. The search grid may have any shape, for example, may be formed as a rectangular grid or as a square grid. In a specific process of generating the search grid, optionally, it is possible to generate a search grid by placing Ap(i, j) in the upper left corner in the case where the joint point coupling vector is in the first quadrant (i.e., the pixel coordinate values in the x direction and the y direction of the joint point coupling vector are both positive values); generate a search grid by placing Ap(i, j) in the upper right corner in the case where the joint point coupling vector is in the second quadrant (i.e., the pixel coordinate value in the x direction of the joint point coupling vector is a negative value, and the pixel coordinate value in the y direction is a positive value); generate a search grid by placing Ap(i, j) in the lower right corner in the case where the joint point coupling vector is in the third quadrant (i.e., the pixel coordinate values of the joint point coupling vector in the x direction and the y direction are both negative values); and generate a search grid by placing Ap(i, j) in the lower left corner in the case where the joint point coupling vector is in the fourth quadrant (i.e., the pixel coordinate values of the joint point coupling vector in the x direction is a positive value, and the pixel coordinate values of the joint point coupling vector in the y direction is a negative value). FIG. 8 illustrates an example of a square search grid having the origin at Ap(i, j) and a length of k pixels for the vector vec illustrated in FIG. 7 where k is a positive integer and each grid point corresponds to one pixel point. In this search grid, considering that the vector vec is in the first quadrant, Ap(i, j) can be arranged in the upper left corner to generate the search grid. In the present embodiment, if the origin Ap(i, j) is expressed as Ap(0, 0) in the pixel coordinates in an xy coordinate system, a pixel point adjacent rightward to the origin in the x direction is expressed as, for example, (0, 1), and a pixel point adjacent downward to the origin in the x direction is expressed as, for example, (1, 0), and the expressions of the remaining pixel points are also determined one by one.

From the search grid generated as in FIG. 8, one pixel point $Bp(i_{Bp}, j_{Bp})$ can be found such that the included angle of the vector ApBp with respect to the x axis is closest to θ illustrated in FIG. 7. In the process of determining the pixel point $Bp(i_{Bp}, j_{Bp})$, it is possible to optionally find one pixel point in a pixel area close to the point Ap(i, j) and to calculate the included angle between the vector ApBp and the x axis, so as to obtain an included angle that is closest to the value θ. For example, searching is performed for every pixel point in a specific pixel area near the point Ap(i, j), to calculate the included angle value between the x-axis and a vector constituted with the searched pixel point and the point Ap(i, j). From the calculation result, it is possible to find a pixel point at which the difference between the included angle and the value θ is minimum.

Specific steps of searching for a pixel point $Bp(i_{Bp}, j_{Bp})$ in a search grid in an embodiment in the present disclosure will be described in detail below.

First, the included angle between the x axis and a vector directed to the position of each pixel point from the point Ap(i, j) on the search grid is stored as an element in a (k−1)×(k−1) matrix Theta_template. This matrix may be considered as a template of the search grid.

$$\text{Theta\_template} = \begin{bmatrix} \theta_{1,1} & \theta_{1,2} & \theta_{1,3} & & \theta_{1,k-1} \\ \theta_{2,1} & \theta_{2,2} & \theta_{2,3} & \cdots & \theta_{2,k-1} \\ \theta_{3,1} & \theta_{3,2} & \theta_{3,3} & & \theta_{3,k-1} \\ \vdots & & & \ddots & \vdots \\ \theta_{k-1,1} & \theta_{k-1,2} & \theta_{k-1,3} & \cdots & \theta_{k-1,k-1} \end{bmatrix}_{(k-1)\times(k-1)} \quad (3)$$

$$= \begin{bmatrix} \arctan\frac{1}{1} & \arctan\frac{1}{2} & \arctan\frac{1}{3} & & \arctan\frac{1}{k-1} \\ \arctan\frac{2}{1} & \arctan\frac{2}{2} & \arctan\frac{2}{3} & \cdots & \arctan\frac{2}{k-1} \\ \arctan\frac{3}{1} & \arctan\frac{3}{2} & \arctan\frac{3}{3} & & \arctan\frac{3}{k-1} \\ \vdots & & & \ddots & \vdots \\ \arctan\frac{k-1}{1} & \arctan\frac{k-1}{2} & \arctan\frac{k-1}{3} & \cdots & \arctan\frac{k-1}{k-1} \end{bmatrix}_{(k-1)\times(k-1)}$$

In Equation (3), subscripts in each element of the matrix Theta_template represent the pixel distances in the horizontal axis x and in the vertical axis y, respectively, between the corresponding pixel point to be searched and the origin Ap(i, j). For example, $\theta_{1,1}$ can represent an included angle between one of the pixel points (1, 1), (−1, 1), (1, −1), and (−1, −1) and the origin Ap(0, 0). In the (k−1)×(k−1) matrix, in the case where a vector vec is directed along the horizontal axis or the vertical axis (i.e., in the case of the included angle being 0°, 90°, 180° or 270°), in general, there is no need to perform searching using the matrix of Equation (3), and the pixel positions of the start point and end point of this vector can be directly determined. Therefore, only cases where pixel points to be searched are not positioned on the horizontal axis x or the vertical axis y are considered.

Thereafter, another matrix theta may be generated to have the same dimensions as the matrix Theta_template (i.e., theta is also a (k−1)×(k−1) matrix). For example, in the embodiment in the present disclosure in which the matrix Theta_template is exemplified as in Equation (3), if the joint point coupling vector vec is in, for example, the first or third quadrant illustrated in FIG. 8, all elements of the matrix theta can be assigned to θ. If the joint point coupling vector vec is in the second or fourth quadrant, all elements of the matrix theta can be assigned to −θ.

Thereafter, from the matrix (Theta_template-theta), it is possible to find a certain element having the minimum absolute value in the matrix, and to obtain a row index n and a column index m in the entire search grid for a pixel point corresponding to the element.

Both the search grid generation and the pixel point search process are based on Ap(i, j) as the origin of the xy coordinate system. In practical applications, it is necessary to obtain a corresponding pixel point $Bp(i_{Bp}, j_{Bp})$ of an element having the minimum absolute value in the matrix, and to obtain the absolute pixel coordinates in the ij coordinate system using i and j as coordinate axes. Optionally, based on the obtained row index n and column index m, it is possible to calculate the absolute pixel coordinates of the pixel point $Bp(i_{Bp}, j_{Bp})$, as described in a specific method below.

In the case where the joint point coupling vector is in the first quadrant, the pixel coordinates of $Bp(i_{Bp}, j_{Bp})$ are as follows.

$$(i_{Bp}, j_{Bp}) = (i+n, j+m) \quad (4)$$

Further, as the other examples, in the case where the joint point coupling vector is in the second quadrant, the pixel coordinates of $Bp(i_{Bp}, j_{Bp})$ are as follows.

$$(i_{Bp}, j_{Bp}) = (i-n, j+m) \quad (5)$$

In the case where the joint point coupling vector is in the third quadrant, the pixel coordinates of $Bp(i_{Bp}, j_{Bp})$ are as follows.

$$(i_{Bp}, j_{Bp}) = (i-n, j-m) \quad (6)$$

In the case where the joint point coupling vector is in the fourth quadrant, the pixel coordinates of $Bp(i_{Bp}, j_{Bp})$ are as follows.

$$(i_{Bp}, j_{Bp}) = (i+n, j-m) \quad (7)$$

Also, in the case where there are two or more pixel points for which the minimum absolute value is the same for the corresponding elements in the matrix (Theta_template-theta), it is possible to select an element having a greater row index and/or a greater column index in this matrix, and so as to obtain a corresponding pixel point to be set as the pixel point $Bp(i_{Bp}, j_{Bp})$.

Finally, after having obtained the pixel point $Bp(i_{Bp}, j_{Bp})$ and the joint point coupling vector represented by the pixel point in the distortion-corrected image, in order to obtain a corresponding joint point coupling vector of the second part of the original image, the obtained joint point coupling vector of the distortion-corrected image can be mapped back into the second part of the original image. When the joint point coupling vector of the distortion-corrected image is mapped back into the second part of the original image, in the case where the length l of the joint point coupling vector represents the reliability of the joint point coupling relationship, in order to represent the reliability of the same joint point coupling relationship, the length of the joint point coupling vector before and after the mapping can be set to the same value. For example, based on the pixel points Ap(i, j) and $Bp(i_{Bp}, j_{Bp})$ in the distortion-corrected image, it is possible to calculate corresponding pixel points Ae $(i_{Ae}, j_{Ae})$ and Be $(i_{Be}, j_{Be})$, and to obtain the joint point coupling vector in the corresponding second part of the original image, for which the direction of the vector is directed from Ae $(i_{Ae}, j_{Ae})$ to Be $(i_{Be}, j_{Be})$, and the length is set to be equal to 1. In this way, it is possible to maintain the same reliability in the joint point coupling vector in the second part of the original image obtained by the mapping.

Figure 9:
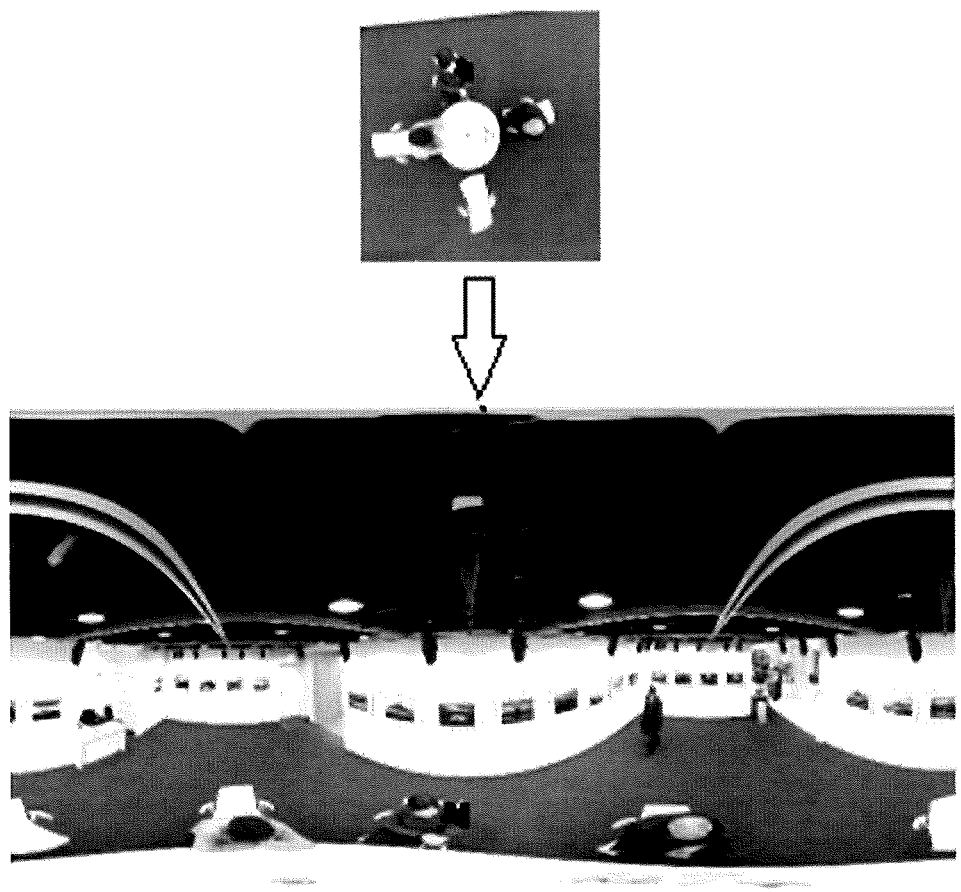
FIG. 9 is a diagram illustrating one joint point coupling vector in a distortion-corrected image of a second part is mapped back into the original image in an embodiment in the present disclosure.

FIG. 9 is a diagram illustrating that one joint point coupling vector (from the left shoulder to the left elbow of a person in the middle) in the distortion-corrected image is mapped back into the second part of the original image according to an embodiment in the present disclosure. The arrow in the middle indicates a mapping process. As such, based on a mapping relationship between the distortion-corrected image and the second part of the original image, it is possible to map the joint point coupling vector from the left shoulder to the left elbow in the distortion-corrected image back into the second part of the original image. The obtained joint point coupling vector is indicated by a black arrow in the image.

According to the above process, after having obtained the joint point reliability and the joint point coupling vector fields of the first part and the second part of the original image, respectively, it is possible to recognize a person in the original image. For example, first, by performing non-maximum suppression processing with respect to the obtained joint point reliability of the first part and the second part of the original image, it is possible to obtain a set of discrete candidate joint points in the original image. Thereafter, for all types of joint points and types of joint point coupling vectors according to the current embodiment, it is possible to express all possible joint point coupling relationships in the set of candidate joint points in the obtained original image. Also, based on the obtained joint point coupling vectors of the first part and the second part of the original image, it is possible to determine the joint point coupling relationships in the original image. For example, based on the corresponding length of the obtained joint point coupling vector of the original image, it is possible to determine the reliability of each joint point coupling relationship. Based on this, it is possible to maintain a joint point coupling relationship having higher reliability than a certain specific threshold value, and to discard a joint point coupling relationship having lower reliability. Finally, based on the obtained joint point coupling relationships in the obtained original image, it is possible to determine a series of feasible joint points corresponding to an object and their coupling relationships, and to recognize the object in the original image.

Figure 10A:
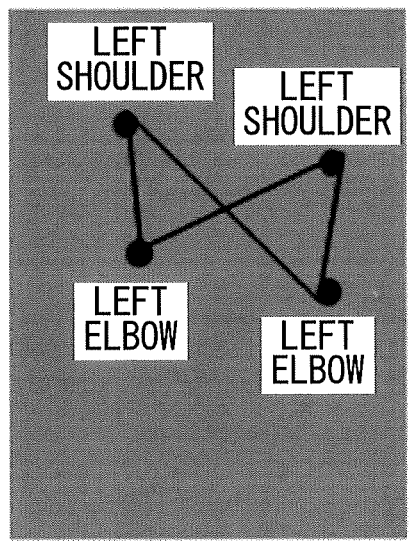
FIG. 10A is a diagram illustrating a set of candidate joint points in an obtained original image in an embodiment in the present disclosure.
Figure 10B:
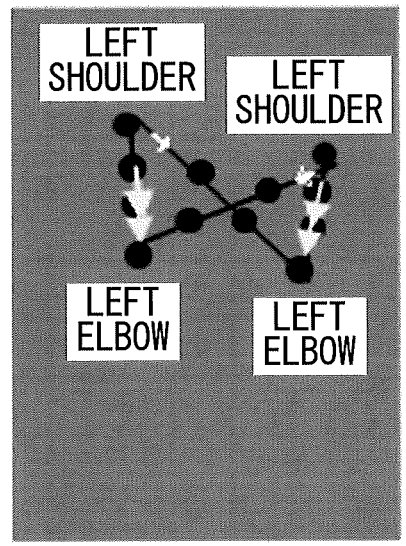
FIG. 10B is a diagram illustrating the reliability of the joint point coupling relationship obtained based on FIG. 10A.
Figure 10C:
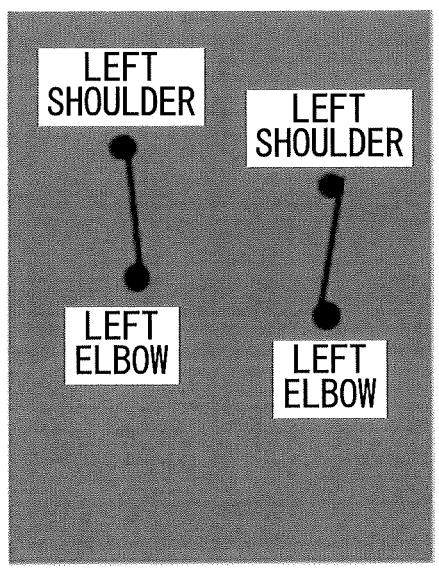
FIG. 10C is a diagram of determined joint point coupling relationships.

FIGS. 10A to 10D are diagrams illustrating an object recognition process according to an embodiment in the present disclosure. Here, FIG. 10A illustrates a set of two types of candidate joint points in an obtained original image. The original image illustrated in FIG. 10A includes two left shoulder joint points and two left elbow joint points. Based on the types of joint point coupling vectors of the adopted left shoulder and left elbow, in FIG. 10A, all possible left shoulder and left elbow joint point coupling relationships are further drawn in black lines. Based on the obtained set of candidate joint points of the original image in FIG. 10A and all corresponding joint point coupling relationships, in order to determine the reliability of each joint point coupling relationship, in FIG. 10B, the reliability is calculated for the joint point coupling relationship. Specifically, based on the length of the corresponding type of the obtained joint point coupling vector in the original image, a line integral is calculated for the corresponding joint point coupling vector along the coupling direction of every combination of the left shoulders and left elbows. This enables to obtain the reliability for every joint point coupling relationship. As illustrated in FIG. 10B, the reliability is high for joint point coupling relationships between left shoulders and left elbows indicated by two continuous long arrows. Arrows corresponding to the other joint point coupling relationships are short, which indicates that the corresponding reliability is low. Therefore, it is possible to maintain the joint point coupling relationships having the high reliability, and to obtain a coupling relationship diagram between the left shoulders and left elbows as illustrated in FIG. 10C. Therefore, it can be understood that two joint point coupling relationships between the left shoulders and the left elbows illustrated in FIG. 10C represent two different objects, namely, two different persons. Finally, similar calculation can be performed for the other types of joint points and joint point coupling relationships, and then, by drawing a recognition result of the objects in the original image illustrated in FIG. 10D, it is possible to obtain the recognition result of the objects in the original image corresponding to the joints of the two objects (the two persons) and the coupling relationships. Optionally, these two persons may also be selected by respective detection frames to display the recognition result of the objects.

According to the image processing method in the present disclosure, it is possible to partition an obtained original image, and to correct only the second part in the original image to be supplied to the subsequent object recognition process. The image processing method and apparatus as such enable to reduce the number of processing steps of image correction, to improve the efficiency of image processing, and to improve the precision of object recognition.

Also, according to the image processing method according to the embodiment in the present disclosure, unlike using a merging process for detecting frames when recognizing objects in an image, training data is used for a neural network, by which an object is recognized at a finer vector level. This enables to further improve the precision of object recognition.

In the following, an image processing apparatus will be described according to an embodiment in the present disclosure with reference to FIG. 11. FIG. 11 is a block diagram of an image processing apparatus 1100 according to an embodiment in the present disclosure. As illustrated in FIG. 11, the image processing apparatus 1100 includes an obtainment unit 1110, a partition unit 1120, a correction unit 1130, and a recognition unit 1140. Other than these units, the image processing apparatus 1100 may further include other members. However, such members are not relevant to the contents of the embodiment in the present disclosure, the illustration and description are omitted here. In addition, specific details of the following operations performed by the image processing apparatus 1100 according to the present embodiment in the present disclosure are virtually the same as the details described with reference to FIGS. 1 to 10D; therefore, duplicated descriptions will be omitted for the same details.

The obtainment unit 1110 of the image processing apparatus 1100 in FIG. 11 obtains an original image.

The original image obtained by the obtainment unit 1110 may be a two-dimensional image obtained by an image collection device such as a camera or a video camera, or a two-dimensional frame image cut out from a video. Preferably, in the case where the image collection device is a panoramic camera and the obtained image is a 360-degree panoramic image, the original image may be a two-dimensional image in which the panoramic image is mapped by coordinate transformation. For example, the original image here may be an equidistant cylindrical view in which the panoramic image is mapped by transformation of a latitude-longitude coordinate system.

The partition unit 1120 partitions the original image into a first part and a second part such that the distortion of at least a part of the image in the first part of the original image is smaller than a predetermined threshold, and the distortion of at least a part of the image in the second part of the original image is greater than or equal to the predetermined threshold.

Based on the predetermined threshold, the partition unit 1120 can partition the original image into the first part and the second part. The predetermined threshold may be set based on the scene in which the original image was captured, the type of an object to be recognized, or the like. As one example, it is possible that the first part and the second part of the original image do not overlap each other. As another example, it is possible that the first part and the second part in the original image partially overlap each other. Alternatively, the overlapping parts may be very small, for example, may be constituted with only some lines or some points. Further, in an embodiment, it is possible that the original image includes only a first part and a second part that do not overlap or have tiny overlapping parts. In other examples, the original image may further include a third part or the like that does not overlap with the first part and the second part, or that has tiny overlapping parts. For example, an object to be recognized may not be included in the third part. This eliminates the need to perform subsequent object recognition processing for the third part; further reduces the number of calculation steps in image processing; and thereby, improves the efficiency of the image processing.

For example, in the case where the original image is an equidistant cylindrical view, based on the position of a panoramic camera used when the image was obtained, the partition unit 1120 can partition the original image into the first part and the second part. FIG. 2A is a diagram illustrating an example of height from the ground of a panoramic camera according to an embodiment of the present application. In FIG. 2A, the height H of the panoramic camera from the ground can be H1 or H2 where the height H1 is lower than the height H2. FIG. 2B is a diagram illustrating an example in which an original image is partitioned according to the position of a panoramic camera. In an equidistant cylinder view obtained by the panoramic camera illustrated in FIG. 2B, the vertical coordinate indicates a latitude ranging from −90° to 90°, and the horizontal coordinate indicates a longitude ranging from −180° to 180°. In FIG. 2B, in the case where the height of the panoramic camera from the ground is lower than or equal to the height H1 illustrated in FIG. 2A, the partition unit 1120 can partition the equidistant cylindrical view into a part at a latitude u° and above (e.g., up to 90°) as the second part of the original image, and the remaining part of the original image as the first part. In the case where the height of the panoramic camera from the ground is higher than or equal to the height H2 illustrated in FIG. 2A, the partition unit 1120 can partition the equidistant cylindrical view into a part at a latitude v° and below (e.g., down to −90° as the second part of the original image, and the remaining part of the original image as the first part. Here, the heights H1 and H2 may be input in advance based on the arranged position of the panoramic camera, and u and v can be calculated based on the input heights. In another example, the height of the panoramic camera is not necessarily input in advance; like estimating the height of the panoramic camera, it is possible to recognize the position of a particular object, for example, such as a lamp or a table, in the panoramic image. By this method, the original image is partitioned into a first part and a second part such that the distortion of at least a part of an image in the first part of the original image is smaller than a predetermined threshold, whereas the distortion of at least a part of an image in the second part of the original image is greater than or equal to the predetermined threshold. In this example, when the panoramic camera is set at different heights, the difference in the distributed position (e.g., the height in the equidistant cylindrical view) of an object to be recognized (e.g., a person standing on the ground) in an equidistant cylindrical view is considered. Therefore, by using different partitioning schemes for panoramic images, it is possible to save the resources for image processing as much as possible, and to improve the processing efficiency. The embodiment in which an original image is partitioned according to the height of the panoramic camera is merely an example, and is not limited as such. In practical applications, the original image may be partitioned by other criteria (e.g., the distribution method of a panorama camera, the type of an object to be recognized, the position of an area of interest, and the like).

The correction unit 1130 corrects a second part of the original image so as to obtain a distortion-corrected image corresponding to the second part.

The correction unit 1130 can apply a projection transformation to the second part of the original image, to obtain the distortion-corrected image. Optionally, the correction unit 1130 may apply a perspective projection transformation to the second part of the original image, to obtain a corresponding panoramic perspective view. In the example illustrated in FIG. 3, first, the second part of the original image is transformed from a latitude-longitude coordinate system to a spherical coordinate system where the center of the sphere is C and the radius is R, and a point P on the spherical coordinate system can be projected onto a plane that is tangent to any longitude line. Specifically, a point P', which is obtained by extending a straight line connecting a predetermined point O (in FIG. 3, the point O is equivalent to the center C of the sphere) and the point P on the spherical surface to a plane that is tangent to the sphere at O', can be set as a corresponding perspective point.

Here, as illustrated in FIG. 3, the point O' can be positioned on the spherical surface.

Also, it may be possible to apply the stereo projection transformation to the second part of the original image, to obtain a corresponding stereo projection view as the distortion-corrected image. FIG. 4 is a diagram illustrating an example of performing the stereographic projection transformation of a panoramic image in an embodiment of the present application. In the example illustrated in FIG. 4, first, the second part of the original image is mapped from a latitude-longitude coordinate system to a spherical coordinate system where the center of the sphere is C and the radius is the same R, and a point P on the spherical coordinate system can be projected onto a plane that is tangent to the sphere at any point Q'. In the stereo projection transformation, as illustrated in FIG. 4, the point Q' can be a poll in the spherical coordinate system. Specifically, a point at which a straight line connecting the predetermined point O and a certain point on the spherical surface intersects a plane that is tangent to the sphere at Q' (i.e., a plane that is tangent to the sphere one pole of the spherical coordinate system) can be set as a corresponding projection point. In FIG. 4, for example, the projection point of a point $M_2$ in the spherical coordinate system is $E_2$; the projection point of a point $S_2$ in the spherical coordinate system is $I_2$; the projection point of a point $R_2$ in the spherical coordinate system is $J_2$; and the projection point of the point $L_2$ in the spherical coordinate system is $P_2$.

The above method of applying a projection transformation to the second part of the original image to obtain a distortion-corrected image is merely an example, and is not limited as such. In practical applications, any method can be adopted for applying a projection transformation to the second part of an original image.

The recognition unit 1140 recognizes the first part of the original image and the distortion-corrected image so as to recognize an object in the original image.

Optionally, the recognition unit 1140 may recognize objects in the original image in the first part of the original image and in the distortion-corrected image, respectively. Optionally, the recognition unit 1140 may stitch the first part of the original image and the distortion-corrected image together to obtain a stitched image, so as to recognize in the obtained stitched image an object in the original image. This recognition method enables to further reduce the steps required for object recognition.

Specifically, operations performed by the recognition unit 1140 includes: recognizing feature points and/or recognizing feature point coupling relationships with respect to the first part of the original image and the distortion-corrected image; obtaining the feature points and/or the feature point coupling relationships of the first part of the original image, based on a recognition result of the first part of the original image; and obtaining the feature points and/or the feature point coupling relationships of the distortion-corrected image, based on the recognition result of the distortion-corrected image. Based on the above contents, after the feature point reliability and/or the feature point coupling vector field of the distortion-corrected image have been obtained, the obtained feature point reliability and/or the feature point coupling vector field of the distortion-corrected image can be further mapped back into the second part of the original image, to obtain the feature point reliability and/or the feature point coupling vector field of the second part of the corresponding original image.

Thereupon, recognition of the feature points and/or recognition of the feature point coupling relationships with respect to the first part of the original image and the distortion-corrected image, can further include obtaining the feature point reliability and/or the feature point coupling vector fields of the first part of the original image and the distortion-corrected image, based on training data, by using a neural network, where the training data is data of the feature points and/or the feature point coupling relationships of an object.

Finally, after having obtained the feature point reliability and/or the feature point coupling vector fields of the first part and the second part of the original image, respectively, it is possible to recognize the object in the original image. For example, A detection frame of an object in the original image may be generated (e.g., a face recognition frame, a human body recognition frame, an object recognition frame, and the like).

According to an embodiment in the present disclosure, an object to be recognized in an original image may be a person or an object in the image. For example, in the case where an object to be recognized is a person, a robot, or an animal that includes various joint points and corresponding coupling relationships of the joint points, optionally, a feature point may be a joint point, and a feature point coupling relationship may be a joint point coupling relationship in an embodiment in the present disclosure. In the following, taking these as examples, a specific method of recognizing a person in an original image as an object will be described in the case where the original image is an equidistant cylindrical view.

In the specific recognition process, data of human joint points and joint point coupling relationships can be used as training data, and by using a neural network, the method obtains the joint point reliability and the joint point coupling vector fields of the first part of an original image and the distortion-corrected image. FIG. 5 is a diagram illustrating an example of an image to be processed, which is obtained by stitching a first part of an original image and a distortion-corrected image according to an embodiment in the present disclosure. In FIG. 5, the left part of the stitched image is the first part of the original image that does not require correction, and the right part of the stitched image is the distortion-corrected image after the projection transformation has been applied to the second part of the original image. Optionally, the joint points of a person to be recognized may be set in advance, which may include the following joints: neck, left shoulder, right shoulder, left elbow, right elbow, left wrist, right wrist, left groin, and right groin, as nine types of joints in total. The joint point coupling relationships to be recognized for a person include: neck and left shoulder, neck and right shoulder, left shoulder and left elbow, right shoulder and right elbow, left elbow and left wrist, right elbow and right wrist, neck and left groin, neck and right groin, as eight types of joint point coupling relationships; in other words, eight types of joint point coupling vectors are to be generated. Therefore, in the case of using a neural network to recognize the joint points and the joint point coupling relationships, as the training data, it is possible to use data of the above-described nine types of joints and eight types of joint point coupling relationships of persons previously collected and obtained. In other words, in training data to be adopted and recognition results to be obtained, the number of types of joint points is denoted as Num_joint=9, and the number of types of the joint point coupling relationships is denoted as Num_connections=8.

After having trained the neural network with the training data, the trained neural network recognizes the feature points and/or the feature point coupling relationships of the first part of the original image and the distortion-corrected image. As a result, it is possible to obtain the joint point coupling vector fields constituted with the joint point reliability and the joint point coupling vectors of the first part of the original image and the distortion-corrected image. For example, the obtained joint point reliability can be represented as a matrix jcm[H, W, Num_joints], and the joint point coupling vector field constituted with the joint point coupling vectors can be represented as a matrix jaf[H, W, 2Num_connections]. Here, there exists a two-dimensional representation for each joint point coupling vector in a joint point coupling vector field, which is taken into consideration. Therefore, in the corresponding representation matrix, the joint point coupling vector field can be represented by matrix dimensions that are twice greater than the number of types of joint point coupling relationships. For example, in the case where there are eight types of joint point coupling relationships, for each type of the joint point coupling vector, a two-dimensional representation matrix of the joint point coupling vector is stored (for example, by using one one-dimensional representation matrix in it, the vector coordinate in the x direction is stored, and by using the other one-dimensional representation matrix, the vector coordinate in the y direction is stored). This enables to store eight types of joint point coupling vectors as a 16-dimensional representation matrix. Needless to say, the storage method of the joint point reliability and the joint point coupling vectors is merely an example, and is not limited as such. In one example, the length of a joint point coupling vector may represent the reliability of the corresponding joint point coupling relationship. In this case, for example, in the case where the joint point coupling vector is long, it may indicate that the reliability of the corresponding joint point coupling relationship is high. Conversely, in the case where the joint point coupling vector is short, it may indicate that the reliability of the corresponding joint point coupling relationship is low. Also, in the above matrix, H and W may represent the height and the width, respectively, of an image to which object recognition needs to be applied. For example, in the case of processing the stitched image of the first part of the original image and the distortion-corrected image illustrated in FIG. 5, H and W may be the height and the width of the stitched image, respectively. In the case of processing each of the first part of the original image and the distortion-corrected image, each of the first part of the original image and the distortion-corrected image may have corresponding representation matrices of the joint point reliability and the joint point coupling vector, and these matrices may include different values of H and W.

After having obtained the joint point reliability and the joint point coupling vector field of the distortion-corrected image, further, the obtained joint point reliability and the joint point coupling vector field of the distortion-corrected image are mapped back into the second part of the original image. This enables to obtain the joint point reliability and the joint point coupling vector field of the second part of the corresponding original image. Specifically, based on a mapping relationship between the distortion-corrected image and the second part of the original image, it is possible to map the joint point reliability of the distortion-corrected image back into the second part of the original image. FIG. 6 is a diagram illustrating that, after having stitched the first part of the original image and the distortion-corrected image, one type of joint point (left shoulder) in the stitched image is mapped back into the original image according to an embodiment in the present disclosure. The arrow in the middle indicates a mapping process. Here, in this case, no projection transformation has been performed on the first part of the original image. Therefore, there is no change in the reliability of the joint point obtained in the first part of the original image. Then, based on a mapping relationship between the distortion-corrected image and the second part of the original image, for the distortion-corrected image, the joint reliability of the left shoulder of the distortion-corrected image can be mapped back into the second part of the original image. All of the obtained left shoulder joint points in the original image are indicated by black dots.

FIG. 7 is a diagram illustrating one joint point coupling vector shown in a joint point coupling vector field obtained from a distortion-corrected image. A vector vec illustrated in FIG. 7 starts from a pixel position Ap(i, j) in a distortion-corrected image, and extends in a direction toward (vec$_x$, vec$_y$) illustrated in FIG. 7 where i and j are the absolute coordinates of the pixels along the i direction and j direction, respectively, in an ij coordinate system). According to the embodiment in the present disclosure, the joint point coupling vector vec of the distortion-corrected image in FIG. 7 needs to be mapped back into the second part of the original image. In the mapping process, by setting Ap(i, j) as the origin and the x-axis and y-axis in FIG. 7 as coordinate axes, first, the included angle θ and the length l between the vector vec and the x-axis can be calculated, specifically, as expressed by Equations (1) and (2) described above.

Here, vec$_x$ represents a projection distance in the x direction of the joint point coupling vector vec with the setting of Ap(i, j) as the origin, namely, represents a pixel coordinate value in the x direction. Also, vec$_y$ represents a projection distance in the y direction of the joint point coupling vector vec with the setting of Ap(i, j) as the origin, namely, represents a pixel coordinate value in the y direction.

Thereafter, a search grid can be constructed with the setting of Ap(i, j) as the origin. The search grid may have any shape, for example, may be formed as a rectangular grid or as a square grid. In a specific process of generating the search grid, optionally, it is possible to generate a search grid by placing Ap(i, j) in the upper left corner in the case where the joint point coupling vector is in the first quadrant (i.e., the pixel coordinate values in the x direction and the y direction of the joint point coupling vector are both positive values); generate a search grid by placing Ap(i, j) in the upper right corner in the case where the joint point coupling vector is in the second quadrant (i.e., the pixel coordinate value in the x direction of the joint point coupling vector is a negative value, and the pixel coordinate value in the y direction is a positive value); generate a search grid by placing Ap(i, j) in the lower right corner in the case where the joint point coupling vector is in the third quadrant (i.e., the pixel coordinate values of the joint point coupling vector in the x direction and the y direction are both negative values); and generate a search grid by placing Ap(i, j) in the lower left corner in the case where the joint point coupling vector is in the fourth quadrant (i.e., the pixel coordinate values of the joint point coupling vector in the x direction is a positive value, and the pixel coordinate values of the joint point coupling vector in the y direction is a negative value). FIG. 8 illustrates an example of a square search grid having the origin at Ap(i, j) and a length of k pixels for the vector vec illustrated in FIG. 7 where k is a positive integer and each grid point corresponds to one pixel point. In this search grid, considering that the vector vec is in the first quadrant, Ap(i, j) can be arranged in the upper left corner to generate the search grid. In the present embodiment, if the origin Ap(i, j) is expressed as Ap(0, 0) in the pixel coordinates in an xy coordinate system, a pixel point adjacent rightward to the origin in the x direction is expressed as, for example, (0, 1), and a pixel point adjacent downward to the origin in the x direction is expressed as, for example, (1, 0), and the expressions of the remaining pixel points are also determined one by one.

From the search grid generated as in FIG. 8, one pixel point $Bp(i_{Bp}, j_{Bp})$ can be found such that the included angle of the vector ApBp with respect to the x axis is closest to θ illustrated in FIG. 7. In the process of determining the pixel point $Bp(i_{Bp}, j_{Bp})$, it is possible to optionally find one pixel point in a pixel area close to the point Ap(i, j) and to calculate the included angle between the vector ApBp and the x axis, so as to obtain an included angle that is closest to the value θ. For example, searching is performed for every pixel point in a specific pixel area near the point Ap(i, j), to calculate the included angle value between the x-axis and a vector constituted with the searched pixel point and the point Ap(i, j). From the calculation result, it is possible to find a pixel point at which the difference between the included angle and the value θ is minimum.

Specific steps of searching for a pixel point $Bp(i_{Bp}, j_{Bp})$ in a search grid in an embodiment in the present disclosure will be described in detail below.

First, the included angle between the x axis and a vector directed to the position of each pixel point from the point Ap(i, j) on the search grid is stored as an element in a (k−1)×(k−1) matrix Theta_template. This matrix may be considered as a template of the search grid. A specific method of representing the matrix is shown in Equation (3) described above.

In Equation (3), subscripts in each element of the matrix Theta_template represent the pixel distances in the horizontal axis x and in the vertical axis y, respectively, between the corresponding pixel point to be searched and the origin Ap(i, j). For example, $\theta_{1,1}$ can represent an included angle between one of the pixel points (1, 1), (−1, 1), (1, −1), and (−1, −1) and the origin Ap(0, 0). In the (k−1)×(k−1) matrix, in the case where a vector vec is directed along the horizontal axis or the vertical axis (i.e., in the case of the included angle being 0°, 90°, 180° or 270°), in general, there is no need to perform searching using the matrix of Equation (3), and the pixel positions of the start point and end point of this vector can be directly determined. Therefore, only cases where pixel points to be searched are not positioned on the horizontal axis x or the vertical axis y are considered.

Thereafter, another matrix theta may be generated to have the same dimensions as the matrix Theta_template (i.e., theta is also a (k−1)×(k−1) matrix). For example, in the embodiment in the present disclosure in which the matrix Theta_template is exemplified as in Equation (3), if the joint point coupling vector vec is in, for example, the first or third quadrant illustrated in FIG. 8, all elements of the matrix theta can be assigned to θ. If the joint point coupling vector vec is in the second or fourth quadrant, all elements of the matrix theta can be assigned to −θ.

Thereafter, from the matrix (Theta_template-theta), it is possible to find a certain element having the minimum absolute value in the matrix, and to obtain a row index n and a column index m in the entire search grid for a pixel point corresponding to the element.

Both the search grid generation and the pixel point search process are based on Ap(i, j) as the origin of the xy coordinate system. In practical applications, it is necessary to obtain a corresponding pixel point $Bp(i_{Bp}, j_{Bp})$ of an element having the minimum absolute value in the matrix, and to obtain the absolute pixel coordinates in the ij coordinate system using i and j as coordinate axes. Optionally, based on the obtained row index n and column index m, it is possible to calculate the absolute pixel coordinates of the pixel point $Bp(i_{Bp}, j_{Bp})$, as described in a specific method below.

In the case where the joint point coupling vector is in the first quadrant, the pixel coordinates of $Bp(i_{Bp}, j_{Bp})$ are expressed in Equation (4) described above; as the other examples, in the case where the joint point coupling vector is in the second quadrant, the pixel coordinates of $Bp(i_{Bp}, j_{Bp})$ are expressed in Equation (5) described above; in the case where the joint point coupling vector is in the third quadrant, the pixel coordinates of $Bp(i_{Bp}, j_{Bp})$ are expressed in Equation (6) described above; in the case where the joint point coupling vector is in the fourth quadrant, the pixel coordinates of $Bp(i_{Bp}, j_{Bp})$ expressed in Equation (7) described above; can be expressed.

Also, in the case where there are two or more pixel points for which the minimum absolute value is the same for the corresponding elements in the matrix (Theta_template-theta), it is possible to select an element having a greater row index and/or a greater column index in this matrix, so as to obtain a corresponding pixel point to be set as the pixel point $Bp(i_{Bp}, j_{Bp})$.

Finally, after having obtained the pixel point $Bp(i_{Bp}, j_{Bp})$ and the joint point coupling vector represented by the pixel point in the distortion-corrected image, in order to obtain a corresponding joint point coupling vector of the second part of the original image, the obtained joint point coupling vector of the distortion-corrected image can be mapped back into the second part of the original image. When the joint point coupling vector of the distortion-corrected image is mapped back into the second part of the original image, in the case where the length l of the joint point coupling vector represents the reliability of the joint point coupling relationship, in order to represent the reliability of the same joint point coupling relationship, the length of the joint point coupling vector before and after the mapping can be set to the same value. For example, based on the pixel points Ap(i, j) and Bp($i_{Bp}$, $j_{Bp}$) in the distortion-corrected image, it is possible to calculate corresponding pixel points Ae($i_{Ae}$, $j_{Ae}$) and Be($i_{Be}$, $j_{Be}$), and to obtain the joint point coupling vector in the corresponding second part of the original image, for which the direction of the vector is directed from Ae($i_{Ae}$, $j_{Ae}$) to Be($i_{Be}$, $j_{Be}$), and the length is set to be equal to 1. In this way, it is possible to maintain the same reliability in the joint point coupling vector in the second part of the original image obtained by the mapping.

FIG. 9 is a diagram illustrating that one joint point coupling vector (from the left shoulder to the left elbow of a person in the middle) in the distortion-corrected image is mapped back into the second part of the original image according to an embodiment in the present disclosure. The arrow in the middle indicates a mapping process. As such, based on a mapping relationship between the distortion-corrected image and the second part of the original image, it is possible to map the joint point coupling vector from the left shoulder to the left elbow in the distortion-corrected image back into the second part of the original image. The obtained joint point coupling vector is indicated by a black arrow in the image.

According to the above process, after having obtained the joint point reliability and the joint point coupling vector fields of the first part and the second part of the original image, respectively, it is possible to recognize a person in the original image. For example, first, by performing non-maximum suppression processing with respect to the obtained joint point reliability of the first part and the second part of the original image, it is possible to obtain a set of discrete candidate joint points in the original image. Thereafter, for all types of joint points and types of joint point coupling vectors according to the current embodiment, it is possible to express all possible joint point coupling relationships in the set of candidate joint points in the obtained original image. Also, based on the obtained joint point coupling vectors of the first part and the second part of the original image, it is possible to determine the joint point coupling relationships in the original image. For example, based on the corresponding length of the obtained joint point coupling vector of the original image, it is possible to determine the reliability of each joint point coupling relationship. Based on this, it is possible to maintain a joint point coupling relationship having higher reliability than a certain specific threshold value, and to discard a joint point coupling relationship having lower reliability. Finally, based on the obtained joint point coupling relationships in the obtained original image, it is possible to determine a series of feasible joint points corresponding to an object and their coupling relationships, and to recognize the object in the original image.

Figure 10D:
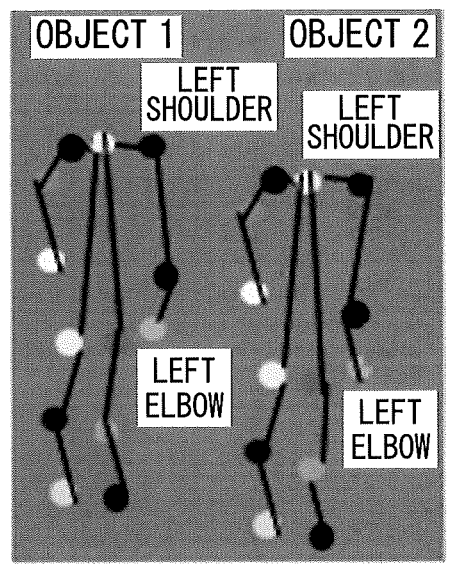
FIG. 10D is a diagram illustrating a recognition result of objects in the original image.
Figure 11:
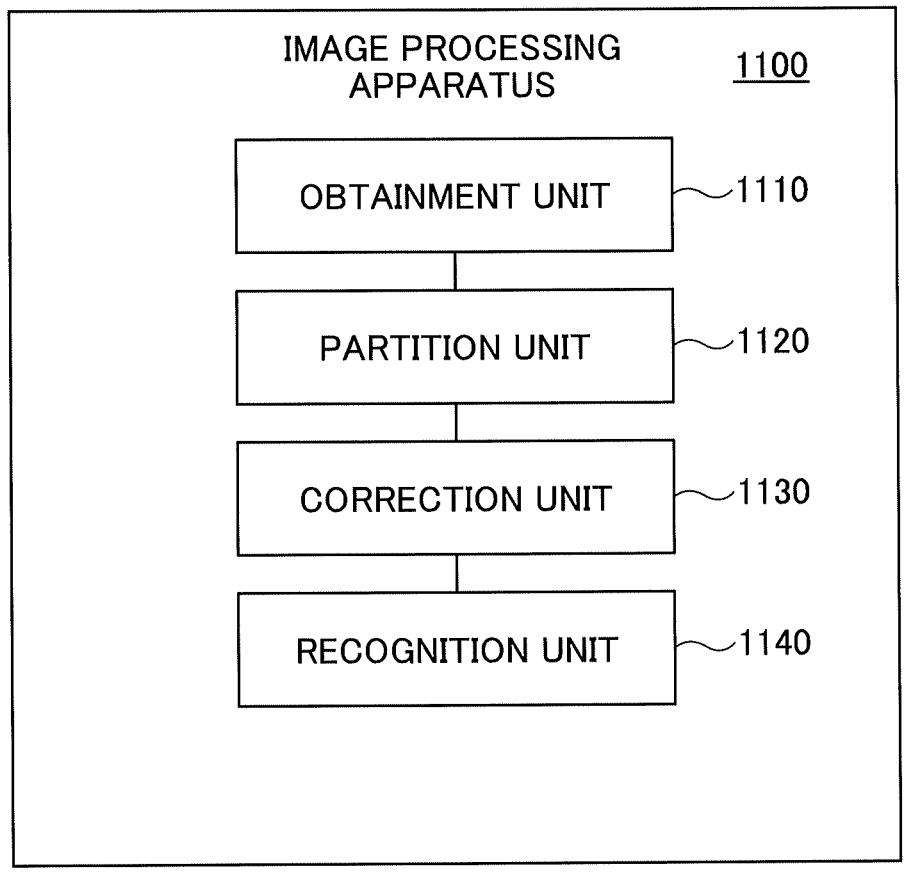
FIG. 11 is a block diagram of an image processing apparatus according to an embodiment in the present disclosure.

FIGS. 10A to 10D are diagram illustrating an object recognition process according to an embodiment in the present disclosure. Here, FIG. 10A illustrates a set of two types of candidate joint points in an obtained original image. The original image illustrated in FIG. 10A includes two left shoulder joint points and two left elbow joint points. Based on the types of joint point coupling vectors of the adopted left shoulder and left elbow, in FIG. 10A, all possible left shoulder and left elbow joint point coupling relationships are further drawn in black lines. Based on the obtained set of candidate joint points of the original image in FIG. 10A and all corresponding joint point coupling relationships, in order to determine the reliability of each joint point coupling relationship, in FIG. 10B, the reliability is calculated for the joint point coupling relationship. Specifically, based on the length of the corresponding type of the obtained joint point coupling vector in the original image, a line integral is calculated for the corresponding joint point coupling vector along the coupling direction of every combination of the left shoulders and left elbows. This enables to obtain the reliability for every joint point coupling relationship. As illustrated in FIG. 10B, the reliability is high for joint point coupling relationships between left shoulders and left elbows indicated by two continuous long arrows. Arrows corresponding to the other joint point coupling relationships are short, which indicates that the corresponding reliability is low. Therefore, it is possible to maintain the joint point coupling relationships having the high reliability, and to obtain a coupling relationship diagram between the left shoulders and left elbows as illustrated in FIG. 10C. Therefore, it can be understood that two joint point coupling relationships between the left shoulders and the left elbows illustrated in FIG. 10C represent two different objects, namely, two different persons. Finally, similar calculation can be performed for the other types of joint points and joint point coupling relationships, and then, by drawing a recognition result of the objects in the original image as illustrated in FIG. 10D, it is possible to obtain the recognition result of the objects in the original image corresponding to the joints of the two objects (the two persons) and the coupling relationships. Optionally, these two persons may also be selected by respective detection frames to display the recognition result of the objects.

According to the image processing apparatus in the present disclosure, it is possible to partition an obtained original image, and to correct only the second part in the original image to be supplied to the subsequent object recognition process. The image processing method and apparatus as such enable to reduce the number of processing steps of image correction, to improve the efficiency of image processing, and to improve the precision of object recognition.

Also, according to the image processing apparatus according to the present embodiment in the present disclosure, unlike using a merging process for detecting frames when recognizing objects in an image, training data is used for a neural network, by which an object is recognized at a finer vector level. This enables to further improve the precision of object recognition.

Figure 12:
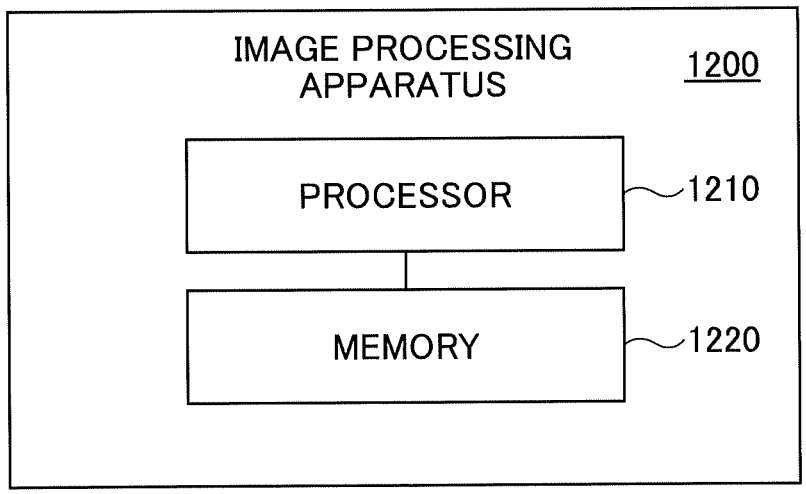
FIG. 12 is a block diagram of an image processing apparatus according to an embodiment in the present disclosure.

In the following, an image processing apparatus will be described according to an embodiment in the present disclosure with reference to FIG. 12. FIG. 12 is a block diagram of an image processing apparatus 1200 according to the present embodiment in the present disclosure. As illustrated in FIG. 12, the apparatus 1200 may be a computer or a server.

As illustrated in FIG. 12, the image processing apparatus 1200 includes one or more processors 1210 and a memory 1220, and in addition to these, the image processing apparatus 1200 may include an input device, an output device, and the like (not illustrated) that can be interconnected via a bus system and/or other types of connection mechanisms. Note that the components and configuration of the image processing apparatus 1200 illustrated in FIG. 12 are merely examples, and are not limited as such. The image processing apparatus 1200 may include other components and configurations as needed.

The processor 1210 may be a central processing unit (CPU) or another type of processing unit having data processing and/or command execution capabilities, and may perform desired functions using computer program commands stored in memory 1220, which includes: obtaining an original image; partitioning the original image into a first part and a second part such that distortion of at least a part of an image in the first part of the original image is smaller than a predetermined threshold, and distortion of at least a part of an image in the second part of the original image is greater than or equal to the predetermined threshold; correcting the second part of the original image so as to obtain a distortion-corrected image corresponding to the second part; and recognizing the first part of the original image and the distortion-corrected image so as to recognize an object in the original image.

The memory 1220 may include one or more computer program products, and the computer program products may include various forms of computer-readable recording media, for example, a volatile memory and/or a non-volatile memory. The computer-readable recording medium can store one or more computer program commands, and the processor 1210 executes the program commands so as to execute the functions of the image processing apparatus of the embodiment in the present disclosure and/or other desired functions, and/or the image processing method of the embodiment in the present disclosure. Various application programs and various items of data can be stored in the computer-readable recording medium.

In the following, a computer-readable recording medium storing a computer program will be described according to an embodiment in the present disclosure. The computer program can implement the following steps by a processor: obtaining an original image; partitioning the original image into a first part and a second part such that distortion of at least a part of an image in the first part of the original image is smaller than a predetermined threshold, and distortion of at least a part of an image in the second part of the original image is greater than or equal to the predetermined threshold; correcting the second part of the original image so as to obtain a distortion-corrected image corresponding to the second part; and recognizing the first part of the original image and the distortion-corrected image so as to recognize an object in the original image.

Of course, the specific embodiments described above are merely examples, not limited as such, and those skilled in the art may merge and combine some steps and devices in the embodiments described separately, based on the ideas of the present inventive concept, so as to enjoy the effects of the present inventive concept. Embodiments based on such merging and combining are also included in the present inventive concept, which are not described here one by one.

The advantages, benefits, and effects mentioned in the present disclosure are merely examples, and are not limited as such, and these advantages, benefits, and effects are not indispensable to each embodiment in the present disclosure. Also, the specific details disclosed as above are merely examples provided only for easier understandability, and are not limited as such. The above details are not limited as follows. In other words, in order to realize the present disclosure, it is essential to use the above specific details.

The components, devices, equipment, and block diagrams of a system according to the present disclosure are merely examples, and are not necessarily required or implied to be connected, laid out, or arranged as in the way illustrated in the block diagrams. As will be apparent to those skilled in the art, these components, devices, equipment, and systems can be connected, laid out, and arranged in any way. Terms such as "inclusive", "include", and "having" are open words, refer to "including but not limited to", and may be used interchangeably. The words "or" and "and" used herein may refer to the word "and/or", and may be used interchangeably unless clearly indicated in the context. The word "for example" used here indicates "the example is not limited", and may be used interchangeably.

The step flow chart in the present disclosure and the above description are merely examples, and as would be appreciated by those skilled in the art who do not intend to require or imply to perform the steps of each embodiment in the illustrated order, the steps in the embodiment may be performed in any order. The words such as "after", "thereafter", and "next" do not intentionally limit the order of the steps. These words are only to guide the reader in reading these methods. Also, any reference to a singular element using the article "a", "an", or "the" does not limit the element to be singular.

Also, the steps and devices in each embodiment in the present specification are not limited to execution in a certain embodiment; in practice, some steps and devices related to the embodiments in the present specification may be combined based on the ideas of the present inventive concept to form new embodiments, and these new embodiments are also included within the scope in the present inventive concept.

Each operation in the above described method can be performed by any suitable means capable of performing the corresponding function. Such means may include, but are not limited to, various hardware and/or software components and/or modules, circuits, application specific integrated circuits (ASICs), or processors.

General purpose processors, digital signal processors (DSPs), application specific integrated circuits (ASICs), field programmable gate arrays (FPGAs) or other programmable logic devices (PLDs), discrete gates or transistor logic, discrete hardware components, or any combination of these designed to perform the functions described herein may be used for implementing or describing the exemplified logic blocks, module, circuits, and the like. A general-purpose processor may be a microprocessor; alternatively, the processor may be any processor, controller, microcontroller, or state machine that can be obtained in a business environment. A processor may further be implemented as a combination of computing devices. For example, examples may include a combination of a DSP and a microprocessor, multiple microprocessors, one or more microprocessors interoperating with a DSP core, or any other combinations.

The combined steps of the methods or algorithms described in the present disclosure can be incorporated into hardware directly, into software modules executed by a processor, or into a combination of the two. The software modules may be recorded on any type of tangible recording medium. Usable recording media include, for example, a random access memory (RAM), a read-only memory (ROM), a high-speed flash memory, an EPROM memory, an EEPROM memory, a register, a hard disk, a movable disk, and a CD-ROM. The recording medium is coupled with a processor so that the processor reads information from the recording medium and writes information to the recording medium. Alternatively, the recording medium is integrated with the processor. A software module may be a single command or multiple commands, and may be distributed on several different code segments, between different programs, and across multiple storage media.

The method invented herein includes one or more operations for implementing the described method. The methods and/or the operations are interchangeable with one another without deviating from the claims. In other words, except for the case where a specific order of operations is specified, the specific order and/or execution of operations may be changed without deviating from the claims.

The functions may be implemented by hardware, software, firmware, or any combination of these. In the case of being implemented by software, the functions may be store as one or more commands in a computer-readable medium. A recording medium may be any available medium that can be accessed by a computer. Examples may be listed as follows, but not limited as such. The computer-readable media include RAMs, ROMs, EEPROMs, CD-ROMs or any other optical disk storage, magnetic disk storage or any other magnetic memories, and any other secure media in which desired program codes in the forms of commands or data structures are stored and carried, and capable of accessing a computer. The disks used here include compact disks (CDs), laser disks, optical disks, digital versatile disks (DVDs), soft magnetic disks and Blu-ray disks.

Therefore, the computer program product can perform the operations described herein. For example, such a computer program product is a computer-readable tangible medium having commands stored (and/or encoded) thereon, and the commands are executed by one or more processors so as to perform the operations described herein. The computer program product may include a packaging material.

Software or commands can also be transmitted through a transmission medium. For example, the software can be transmitted from a website, server or any other remote source through a coaxial cable, optical fiber, twisted pair cable, digital subscriber line (DSL), or a transmission medium using wireless technologies such as infrared, wireless, or microwave.

In addition, modules and/or any other suitable means for performing the methods and techniques described herein may be downloaded and/or otherwise obtained by a user terminal and/or a base station, as appropriate. For example, such a device may be coupled with a server to facilitate the transmission of means for performing the methods described herein. Alternatively, the various methods described herein may be provided in a storage member (e.g., a physical recording medium such a RAM, RAM, CD, or soft magnetic disk) so as to be obtained when the device is coupled with a user terminal and/or a base station, or when the storage member is provided for the device. Further, any other suitable techniques for providing a device with the methods and techniques described herein can be utilized.

Other examples and implementations may be found within the claims and the gist of the present inventive concept. For example, based on the nature of software, the functions described above may be implemented using software executed by a processor, hardware, firmware, hard wired logic, or any combination of these. Features to implement the functions may also be physically arranged at respective locations, where the arrangement includes distribution of functional parts to be implemented at different physical locations. Also, as used herein and in the claims, "at least one" and "or" used for enumeration mean separate enumeration. In other words, enumeration such as "at least one of A, B, or C" means A, B, or C; AB, AC, or BC; or ABC (i.e., A, B and C). Also, the term "exemplary", "exemplified", or the like does not imply that the described example is optimal or better than the other examples.

Various changes, replacements, and modifications of the techniques described herein may be made without deviating from the techniques taught in the claims. In addition, the claims in the present disclosure are not limited to the specific contents of the processing, equipment, manufacturing, event configurations, means, methods, and operations described above. Processing, equipment, manufacturing, event configurations, means, methods, or operations that exist or have been developed by executing substantially the same functions or by applying substantially the same results as described herein may be utilized. Therefore, the claims include such processing, equipment, manufacturing, event configurations, means, methods, or operations within the scope.

The contents of the inventive concept provided above can be made or used by those skilled in the art. Various corrections of these schemes would be obvious to those skilled in the art, and the general principles defined herein may be applied to other applications without deviating from the scope of the present inventive concept. Therefore, the present inventive concept is not limited to the schemes disclosed herein, but follows the broadest scope consistent with the invented principles and novel features herein.

The above description has been made for purposes of exemplification and description. In addition, this description is not intended to limit the embodiments in the present disclosure to the invented forms herein. As above, multiple examples and embodiments have been discussed. Note that it would be obvious to those skilled in the art that variations, corrections, modifications, additions, and sub-combinations of the examples and embodiments can be made.

The present application claims priority under 35 U.S.C. § 119 of Chinese Patent Application No. 201910170972.8 filed on Mar. 7, 2019, the entire contents of which are hereby incorporated by reference.

What is claimed is:

1. An image processing method, executed by a computer including a memory and a processor, the method comprising:
   obtaining an original image;
   partitioning the original image into a first part and a second part such that distortion of at least a part of an image in the first part of the original image is smaller than a predetermined threshold, and distortion of at least a part of an image in the second part of the original image is greater than or equal to the predetermined threshold;
   correcting the second part of the original image so as to obtain a distortion-corrected image corresponding to the second part; and
   recognizing the first part of the original image and the distortion-corrected image so as to recognize an object in the original image,
   wherein the original image is an equidistant cylindrical view, and
   wherein the partitioning partitions the original image into the first part and the second part, based on a height from a ground of a panoramic camera used for obtaining the equidistant cylindrical view.

2. The method as claimed in claim 1, wherein the correcting of the second part of the original image so as to obtain the distortion-corrected image corresponding to the second part, is performed by applying a projection transformation to the second part of the original image so as to obtain the distortion-corrected image.

3. The method as claimed in claim 1, wherein the recognizing of the first part of the original image and the distortion-corrected image, includes
   recognizing feature points and recognizing feature point coupling relationships with respect to the first part of the original image and the distortion-corrected image, obtaining the feature points and the feature point coupling relationships of the first part of the original image, based on a recognition result with respect to the first part of the original image, and obtaining the feature points and the feature point coupling relationships of the distortion-corrected image, based on a recognition result of the distortion-corrected image.

4. The method as claimed in claim 3, wherein the recognizing of the feature points and the recognizing of the feature point coupling relationships with respect to the first part of the original image and the distortion-corrected image, includes obtaining the feature point reliability and the feature point coupling vector fields of the first part of the original image and the distortion-corrected image, based on training data, by using a neural network, wherein the training data is data of the feature points and the feature point coupling relationships of an object.

5. The method as claimed in claim 4, wherein the recognizing of the first part of the original image and the distortion-corrected image so as to recognize an object in the original image, further maps the feature point reliability and the feature point coupling vector field of the distortion-corrected image back into the feature point reliability and the feature point coupling vector field of the second part of the original image.

6. The method as claimed in claim 5, wherein the recognizing of the first part of the original image and the distortion-corrected image so as to recognize an object in the original image, further recognizes the object in the original image by the feature point reliability and the feature point coupling vector fields of the first part and the second part of the original image.

7. The method as claimed in claim 1, wherein in a case where the height from the ground of the panoramic camera is lower than or equal to a predetermined height, the partitioning partitions the original image into the first part and the second part, such that part of the equidistant cylindrical view at a predetermined latitude and above corresponds to the second part, and a remaining part corresponds to the first part.

8. An image processing apparatus comprising:
an obtainment unit configured to obtain an original image;
a partition unit configured to partition the original image into a first part and a second part such that distortion of at least a part of an image in the first part of the original image is smaller than a predetermined threshold, and distortion of at least a part of an image in the second part of the original image is greater than or equal to the predetermined threshold;
a correction unit configured to correct the second part of the original image so as to obtain a distortion-corrected image corresponding to the second part; and
a recognition unit configured to recognize the first part of the original image and the distortion-corrected image so as to recognize an object in the original image,
wherein the original image is an equidistant cylindrical view, and
wherein the partition unit partitions the original image into the first part and the second part, based on a height from a ground of a panoramic camera used for obtaining the equidistant cylindrical view.

9. An image processing apparatus comprising:
a processor; and
a memory configured to store computer program commands,
wherein when the computer program commands are executed by the processor, the image processing apparatus causes the processor to execute obtaining an original image;
partitioning the original image into a first part and a second part such that distortion of at least a part of an image in the first part of the original image is smaller than a predetermined threshold, and distortion of at least a part of an image in the second part of the original image is greater than or equal to the predetermined threshold;
correcting the second part of the original image so as to obtain a distortion-corrected image corresponding to the second part; and
recognizing the first part of the original image and the distortion-corrected image so as to recognize an object in the original image,
wherein the original image is an equidistant cylindrical view, and
wherein the partitioning partitions the original image into the first part and the second part, based on a height from a ground of a panoramic camera used for obtaining the equidistant cylindrical view.

* * * * *